United States Patent
Huang

(10) Patent No.: US 11,163,734 B2
(45) Date of Patent: *Nov. 2, 2021

(54) DATA PROCESSING METHOD AND SYSTEM AND CLIENT

(71) Applicant: Huawei Technologies Co., Ltd., Shenzhen (CN)

(72) Inventor: Yan Huang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

This patent is subject to a terminal disclaimer.

(21) Appl. No.: 16/240,358

(22) Filed: Jan. 4, 2019

(65) Prior Publication Data
US 2019/0138507 A1 May 9, 2019

Related U.S. Application Data

(63) Continuation of application No. 15/011,074, filed on Jan. 29, 2016, now Pat. No. 10,210,186, which is a (Continued)

(51) Int. Cl.
*G06F 17/30* (2006.01)
*G06F 16/215* (2019.01)
*G06F 16/22* (2019.01)
*G06F 12/0813* (2016.01)
*G06F 16/174* (2019.01)

(52) U.S. Cl.
CPC ........ *G06F 16/215* (2019.01); *G06F 12/0813* (2013.01); *G06F 16/1752* (2019.01); *G06F 16/2282* (2019.01)

(58) Field of Classification Search
CPC ............... G06F 16/215; G06F 16/2282; G06F 16/1752; G06F 12/0813
See application file for complete search history.

(56) References Cited

U.S. PATENT DOCUMENTS 8,745,003 B1 * 6/2014 Patterson .............. G06F 16/128
707/639
8,868,520 B1 10/2014 Raghuwanshi et al.
(Continued)

FOREIGN PATENT DOCUMENTS

CN 102833298 A 12/2012
CN 103177111 A 6/2013
CN 103189867 A 7/2013

OTHER PUBLICATIONS

Machine Translation and Abstract of Chinese Publication No. CN103177111, Jun. 26, 2013, 15 pages.
(Continued)

*Primary Examiner* — Huawen A Peng
(74) *Attorney, Agent, or Firm* — Conley Rose, P.C.

(57) ABSTRACT

A data processing method and system and a client, where a target storage node is determined in a manner of comparing a second vector of received data and first vectors that are corresponding to all storage nodes and prestored on the client that receives the data, and the target storage node no longer needs to be determined in a manner of extracting some fingerprint values as samples from received data and sending the fingerprint values to all storage nodes in a data processing system for query, and waiting for a feedback from the storage nodes.

20 Claims, 5 Drawing Sheets

Related U.S. Application Data continuation of application No. PCT/CN2013/084597, filed on Sep. 29, 2013.

(56) References Cited

U.S. PATENT DOCUMENTS

| | | |
|---|---|---|
| 2007/0233728 A1 | 10/2007 | Puteick et al. |
| 2008/0005141 A1* | 1/2008 | Zheng .................. G06F 3/0641 |
| 2011/0099351 A1 | 4/2011 | Condict |
| 2012/0136842 A1 | 5/2012 | Zhu et al. |
| 2012/0191667 A1* | 7/2012 | Kopylovitz ........... G06F 3/0641 |
| | | 707/692 |
| 2012/0323864 A1 | 12/2012 | Zhu et al. |
| 2013/0290279 A1 | 10/2013 | Aronovich et al. |
| 2014/0012822 A1 | 1/2014 | Aronovich et al. |
| 2014/0344548 A1* | 11/2014 | Friedlander ......... G06F 12/1018 |
| | | 711/206 |

OTHER PUBLICATIONS

Machine Translation and Abstract of Chinese Publication No. CN103189867, Jul. 3, 2013, 33 pages.

Ao, L., et al, "Data Deduplication Techniques," Journal of Software, vol. 21, No. 5, May 2010, pp. 916-929.

Wang, S., "Development and Application of De-Duplication Technology," Institute of Computing Technology, vol. 16, No. 5, Oct. 2010, pp. 9-14.

Foreign Communication From a Counterpart Application, European Application No. 13894821.1, Extend European Search Report dated Jul. 16, 2018, 9 pages.

Foreign Communication From a Counterpart Application, PCT Application No. PCT/CN2013/084597, English Translation of International Search Report dated Jul. 1, 2014, 2 pages.

Foreign Communication From a Counterpart Application, PCT Application No. PCT/CN2013/084597, English Translation of Written Opinion dated Jul. 8, 2014, 7 pages.

* cited by examiner

DATA PROCESSING METHOD AND SYSTEM AND CLIENT

CROSS-REFERENCE TO RELATED APPLICATIONS

This application is a continuation of U.S. patent application Ser. No. 15/011,074 filed on Jan. 29, 2016, which is a continuation of International Patent Application No. PCT/CN2013/084597 filed on Sep. 29, 2013, which are hereby incorporated by references in their entireties.

TECHNICAL FIELD

Embodiments of the present disclosure relate to storage technologies, and in particular, to a data processing method and system and a client.

BACKGROUND

Data deduplication is also called intelligent compression or single instance storage, and is a storage technology in which duplicate data can be automatically searched for, only a unique copy is retained for data that has duplicate copies, and a pointer pointing to the single copy is used to replace other duplicate copies, so as to eliminate redundant data and reduce storage capacity requirements.

In the prior art, a data deduplication technology is widely applied to application environments such as backup and a virtual desktop. A data processing system includes multiple storage nodes, where each storage node has its own deduplication processing engine and storage medium, such as a hard disk. When data needs to be written into a file, the data is divided in a cache to obtain multiple data blocks. A fingerprint value of each data block is calculated, and some fingerprint values as samples from the fingerprint values of each data block are sent to all physical nodes in the data processing system to query. A target physical node with a largest quantity of duplicate fingerprint values is obtained from a query result, and information about all data blocks in a data group corresponding to sampled metadata information is sent to the target physical node for duplicate data query.

In a cluster deduplication technology in the prior art, a fingerprint value sample needs to be sent to all physical nodes for query, which causes too many times of interaction among the physical nodes in a deduplication process. In a case in which there is a larger quantity of physical nodes in a data processing system, when deduplication is executed by each physical node, a calculation amount increases with the quantity of physical nodes in the data processing system, thereby degrading system deduplication performance.

SUMMARY

Embodiments of the present disclosure provide a data processing method and system and a client, so as to improve deduplication performance.

According to a first aspect, an embodiment of the present disclosure provides a data processing method, where the method is applied to a data processing system, the data processing system includes at least one client and multiple storage nodes, and each client is connected to each storage node in the data processing system, where each storage node is corresponding to one first vector, the first vectors corresponding to all the storage nodes in the data processing system are stored on each client, and the method includes receiving, by the at least one client, data, dividing the data into multiple data blocks, and obtaining a second fingerprint value of each data block, obtaining a second vector corresponding to the received data, where the second vector represents a feature of the received data, and comparing the second vector and each first vector stored on the at least one client that receives the data to determine a target storage node, and sending the second fingerprint values corresponding to the multiple data blocks to the target storage node to search for duplicate data, or loading, to the at least one client that receives the data, a first fingerprint value corresponding to a data block stored in the target storage node to search for duplicate data.

With reference to the first aspect, in a first possible implementation manner provided by this embodiment of the present disclosure, the method further includes obtaining a non-duplicate data block in the received data, and storing the obtained non-duplicate data block and a third fingerprint value corresponding to the non-duplicate data block in a cache of the at least one client that receives the data, obtaining a third vector of the non-duplicate data block in the cache when the non-duplicate data block stored in the cache of the at least one client that receives the data meets a preset storage condition, where the third vector represents a feature of all non-duplicate data blocks in the cache, and comparing the third vector and each first vector stored on the at least one client that receives the data to determine a storage node that is used to store the non-duplicate data block in the cache and the third fingerprint value corresponding to the non-duplicate data block in the cache.

With reference to the first possible implementation manner of the first aspect, in a second possible implementation manner provided by this embodiment of the present disclosure, a numerical value of each bit of each second fingerprint value is a feature word, and the obtaining a second vector corresponding to the received data includes extracting N feature words from each second fingerprint value, where N is an integer greater than or equal to 1, and among all the extracted feature words, adding feature words that are at a same location in the second fingerprint values to obtain N numerical values, where the N numerical values form the second vector corresponding to the received data.

With reference to the first possible implementation manner of the first aspect, in a third possible implementation manner provided by this embodiment of the present disclosure, the comparing the second vector and each first vector stored on the at least one client that receives the data to determine a target storage node includes determining, in same multidimensional space, a location of the second vector and a location of the first vector, comparing, in the multidimensional space, the second vector and the first vector to determine at least one first vector closest to the second vector or at least one first vector that forms an included angle, with a smallest cosine value, with the second vector, where a storage node corresponding to the at least one first vector is the target storage node.

According to a second aspect, an embodiment of the present disclosure provides a client, where the client exists in a data processing system, the data processing system further includes multiple storage nodes, and the client is connected to each storage node in the data processing system, where each storage node is corresponding to one first vector, the first vectors corresponding to all the storage nodes in the data processing system are stored on the client, and the client includes a receiving unit configured to receive data, divide the data into multiple data blocks, and obtain a second fingerprint value of each data block, a second-vector obtaining unit configured to obtain a second vector corresponding to the received data, where the second vector represents a feature of the received data, and a processing unit configured to compare the second vector and each first vector stored on the client to determine a target storage node, and send the second fingerprint values corresponding to the multiple data blocks to the target storage node to search for duplicate data, or load, to the client, a first fingerprint value corresponding to a data block stored in the target storage node to search for duplicate data.

With reference to the second aspect, this embodiment of the present disclosure provides a first possible implementation manner, where the client further includes a storage unit configured to obtain a non-duplicate data block in the received data, and store the obtained non-duplicate data block and a third fingerprint value corresponding to the non-duplicate data block in a cache of the client, obtain a third vector of the non-duplicate data block in the cache when the non-duplicate data block stored in the cache of the client meets a preset storage condition, where the third vector represents a feature of all non-duplicate data blocks in the cache, and compare the third vector and each first vector stored on the client to determine a storage node that is used to store the non-duplicate data block in the cache and the third fingerprint value corresponding to the non-duplicate data block in the cache.

With reference to the second aspect and the first possible implementation manner of the second aspect, this embodiment of the present disclosure provides a second possible implementation manner, where a numerical value of each bit of each second fingerprint value is a feature word, and the second-vector obtaining unit is further configured to extract N feature words from each second fingerprint value, where N is an integer greater than or equal to 1, and among all the extracted feature words, add feature words that are at a same location in the second fingerprint values to obtain N numerical values, where the N numerical values form the second vector corresponding to the received data.

With reference to the second aspect and the first possible implementation manner provided by the second aspect, this embodiment of the present disclosure provides a third possible implementation manner, where the processing unit is further configured to determine, in multidimensional space, a location of the second vector and a location of the first vector, compare, in the multidimensional space, the second vector and the first vector to determine at least one first vector closest to the second vector or at least one first vector that forms an included angle, with a smallest cosine value, with the second vector, where a storage node corresponding to the at least one first vector is the target storage node.

According to a third aspect, an embodiment of the present disclosure provides a data processing system, where the data processing system includes multiple storage nodes and the foregoing client, each storage node is corresponding to one first vector, the first vector corresponding to each storage node in the data processing system is stored on the client, and the client is connected to each storage node in the data processing system.

According to a fourth aspect, an embodiment of the present disclosure further provides a client, including a processor, a memory, a communications interface, and a bus, where the processor, the communications interface, and the memory communicate with each other using the bus, and the communications interface is configured to receive and send data, the memory is configured to store a program, and the processor is configured to execute the program in the memory to execute any method in the foregoing first aspect.

According to the embodiments of the present disclosure, a target storage node is determined in a manner of comparing a second vector of received data and first vectors that are corresponding to all storage nodes and prestored on a client that receives the data. A target storage node no longer needs to be determined in a manner of extracting some fingerprint values as samples from received data and sending the fingerprint values to all storage nodes in a data processing system for query, and waiting for a feedback from the storage nodes, thereby avoiding multiple times of interaction between the client and the storage nodes, improving deduplication performance, and reducing a delay while reducing network bandwidth occupation.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure.

Figure 1A:
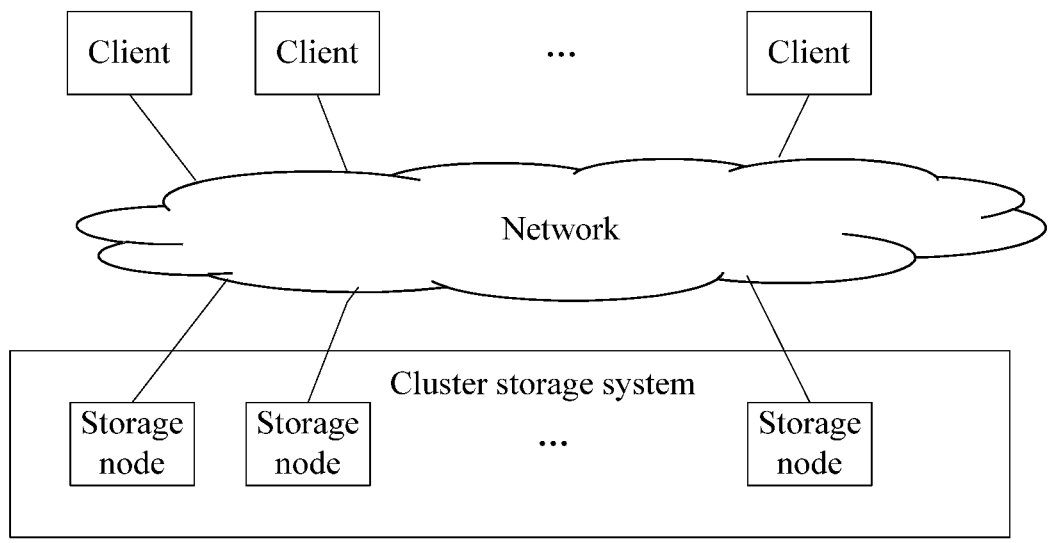
FIG. 1A is a schematic diagram of an architecture of a data processing system according to an embodiment of the present disclosure.

An embodiment of the present disclosure provides a data processing system, where the data processing system includes at least one client and multiple storage nodes, and there may be multiple deployment manners for the at least one client and the storage nodes. This embodiment of the present disclosure provides two deployment manners. For example, as shown in FIG. 1A, in manner 1, each client is connected to each storage node using a network, each storage node in the data processing system is corresponding to one first vector, the first vectors corresponding to all the storage nodes in the data processing system are stored on each client, and the client may be deployed as a software or hardware device on a user side. A system including storage nodes can be called a cluster storage system, and a system including a storage node and a client can be called a data processing system.

Figure 1B:
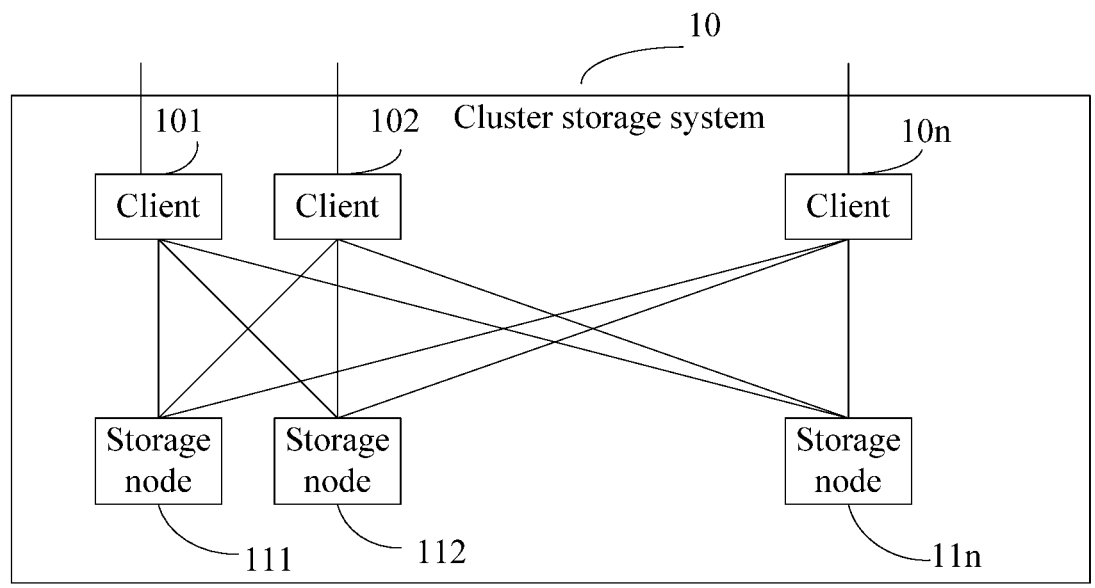
FIG. 1B is a schematic diagram of an architecture of another data processing system according to an embodiment of the present disclosure.

Alternatively, in manner 2, as shown in FIG. 1B, a client may be integrated as a hardware apparatus into a storage node, or may be deployed as a software functional module on a storage node. A cluster storage system into which a client is integrated can also be called a data processing system, and the client performs processing after receiving data sent by a user. A data processing system 10 provided by an embodiment of the present disclosure includes clients 101, 102, . . . , 10n and multiple storage nodes 111, 112, . . . , 11n. Each client receives, using an interface, data sent by a user, where the interface may be a standard protocol interface, such as a network file system (NFS) protocol interface. Each storage node is corresponding to one first vector, where the first vector represents a feature of data stored in the corresponding storage node. In this embodiment, the first vectors corresponding to all the storage nodes in the data processing system are stored on each client. For ease of description, a fingerprint value corresponding to data stored in the storage node in the data processing system is called a first fingerprint value, and each client is connected to each storage node in the data processing system, for example, connected using a network or connected in another manner.

A data block and a fingerprint value corresponding to the data block are stored on each storage node in the data processing system.

The first vector corresponding to each storage node may be set during initialization. The first vectors corresponding to all the storage nodes may be evenly distributed in multidimensional space, and a user may determine specific distribution according to an actual situation during the initialization, which is not limited in this embodiment of the present disclosure.

In a specific application, the client in the data processing system may be an independent entity that is independent from the storage node, or the client may be deployed as a software module in the storage node, or may be deployed on other hardware, and connected to the storage node in the data processing system using a network.

Figure 2A:
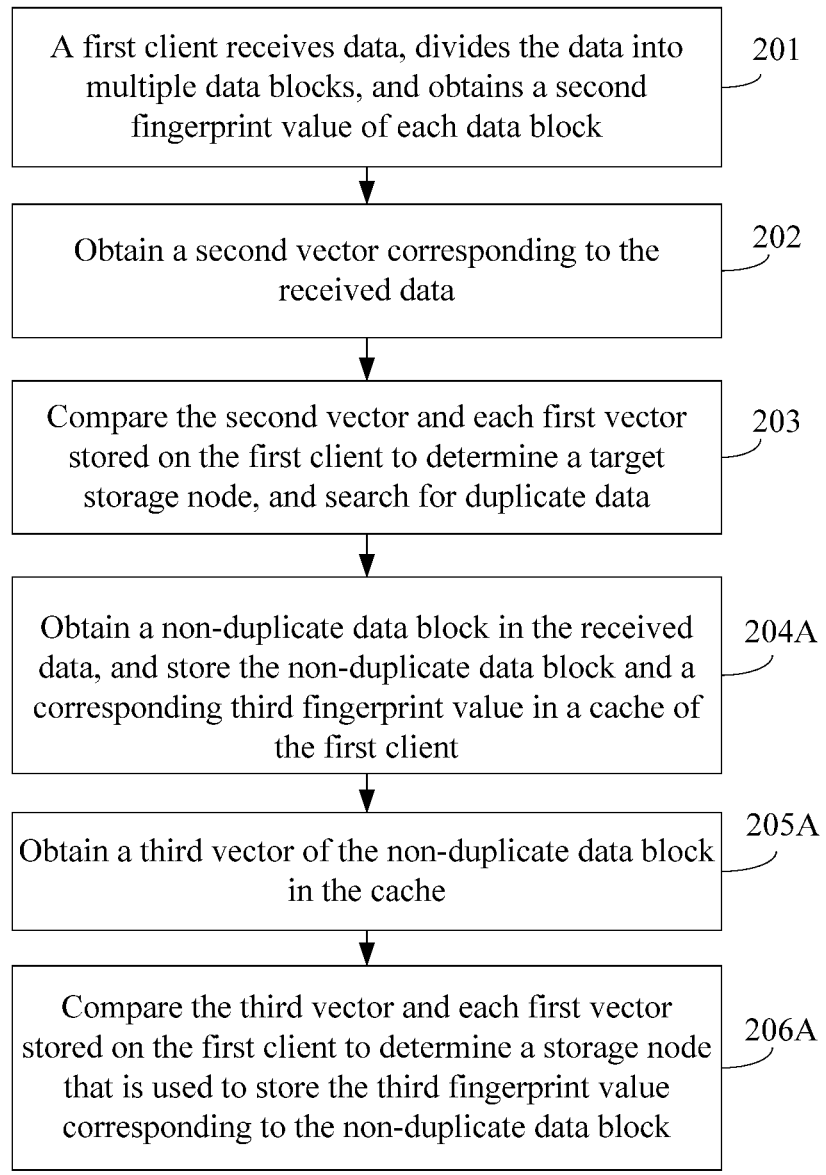
FIG. 2A is a flowchart of a data processing method in a data processing system according to an embodiment of the present disclosure.
Figure 2B:
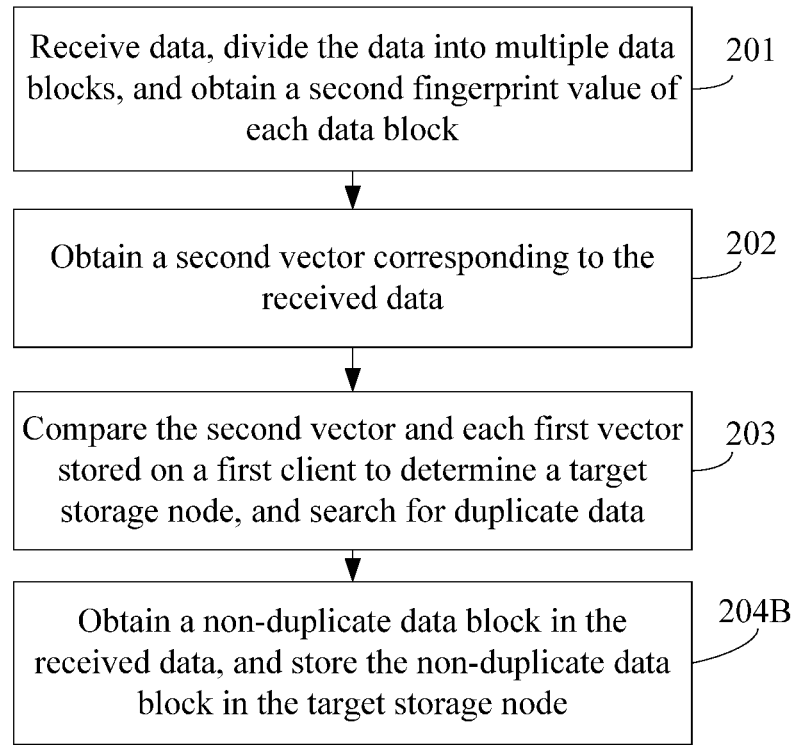
FIG. 2B is a flowchart of a data processing method in another data processing system according to an embodiment of the present disclosure.

FIG. 2A and FIG. 2B are flowcharts of a data processing method in a data processing system according to an embodiment of the present disclosure, using an example in which a client (which is called "first client" in the following) in the data processing system executes the method. As shown in FIG. 2A and FIG. 2B, the method of this embodiment of the present disclosure may include the following steps.

Step 201: Receive data, divide the data into multiple data blocks, and obtain a fingerprint value of each data block, where the fingerprint value corresponding to the data block obtained by division is a second fingerprint value.

To be distinguished from a first fingerprint value corresponding to data stored in a storage node in description, a fingerprint value obtained according to data received by the client is called a second fingerprint value. The first client in the data processing system is used as an example to describe an execution process of this embodiment of the present disclosure. The second fingerprint value corresponding to the data block represents a feature of the corresponding data block. There are multiple methods for obtaining the second fingerprint value in the prior art, for example, calculating a hash value of the data block, and using the hash value as the second fingerprint value of the corresponding data block.

Step 202: Obtain a second vector corresponding to the received data, where the second vector represents a feature of the received data.

A numerical value of each bit in each second fingerprint value is a feature word, and the second vector of the received data may be obtained using the following method.

N feature words are extracted from each second fingerprint value, where N is an integer greater than or equal to 1, and among all the extracted feature words, feature words that are at a same location in the second fingerprint values are added to obtain N numerical values, where the N numerical values form an N-dimensional array that is used as the second vector corresponding to the received data.

In addition, a numerical value of each bit in each second fingerprint value is still a feature word, and the second vector of the received data is obtained, where the second vector corresponding to the received data may also be obtained in the following manner.

N feature words are extracted from each second fingerprint value, where N may be an integer greater than or equal to 1, and a feature word whose numerical value is 0 and that is among all the extracted feature words is converted first into −1 (negative one), and then feature words that are at a same location in the second fingerprint values are added to obtain N numerical values, where the N numerical values form an N-dimensional array that is used as the second vector corresponding to the received data.

A quantity of feature words extracted from each second fingerprint value is not limited in this embodiment of the present disclosure, and may be determined by a user according to an actual situation and requirements. For example, in a case in which each second fingerprint value is of 160 bits, 64 least significant bits of the second fingerprint value may be extracted, or 64 most significant bits may be extracted, or 160 bits of the second fingerprint value may be extracted.

Step 203: Compare the second vector and each first vector stored on the first client to determine a target storage node, and send the second fingerprint values corresponding to the multiple data blocks to the target storage node to search for duplicate data, or load, to the first client, a first fingerprint value corresponding to a data block stored in the target storage node to search for duplicate data.

It should be noted that one or more second vectors may be obtained during acquisition of the second vector of the received data. If the received data is divided into several parts, one second vector is obtained for each data part, and multiple second vectors may be obtained for multiple parts. When the multiple second vectors are obtained, a specific implementation manner for each second vector is the same as a specific operation for one second vector, except that multiple target storage node are determined for the multiple second vectors during determining of a target storage node, and each second vector is corresponding to one target storage node. In step 203, the sending the second fingerprint values corresponding to the multiple data blocks to the target storage node to search for duplicate data is correspondingly sending, to a corresponding target storage node, a second fingerprint value of a data part that is corresponding to a second vector to search for duplicate data.

A method for comparing the second vector and the first vector in step 203 may be method 1: determining, in same multidimensional space, a location of the second vector and a location of the first vector, and comparing, in the multidimensional space, the second vector and the first vector to determine that a storage node corresponding to at least one first vector closest to the second vector is the target storage node, or method 2: determining, in multidimensional space, a location of the second vector and a location of the first vector, and comparing the second vector and the first vector to determine that a storage node corresponding to at least one first vector that forms an included angle, with a smallest cosine value, with the second vector is the target storage node.

One or more first vectors may be determined to be closest to the second vector, where a quantity required to be determined needs to be preset by a user according to an actual situation. For example, 2 first vectors closest to the second vector are determined, and storage nodes individually corresponding to the 2 first vectors are the target storage nodes.

In this embodiment of the present disclosure, a dimension of the second vector may be the same as or may be different from a dimension of the first vector. In a case of different dimensions, the dimensions need to be aligned by means of zero padding, so that the location of the first vector and the location of the second vector can be determined in the same multidimensional space, and the two vectors can be compared.

To improve accuracy in reflecting, by the first vector, a feature of stored data in the corresponding storage node, the method of this embodiment may further include the following.

The storage node updates, at preset intervals and according to the data stored in the storage node, the first vector corresponding to the storage node, where the first vector represents the feature of the data stored in the storage node, and notifies the client of an updated first vector corresponding to the storage node, and the client receives an update message that is sent by the storage node and that is corresponding to the first vector.

A specific update manner may be the same as the method for calculating the second vector of the received data.

According to this embodiment of the present disclosure, a second vector corresponding to received data is obtained, and the second vector and first vectors that are corresponding to all storage nodes in a data processing system and stored on a client that receives the data are compared. A target storage node is determined in a vector comparison manner, it is deemed that data stored in the target storage node and the received data are more similar, and the data in the target storage node serves as an object for comparison with the received data, and therefore, the target storage node is also called a similar storage node. In this embodiment of the present disclosure, a second vector reflects a feature of the received data, and one first vector is corresponding to one storage node and may be used to reflect a feature of data stored in the corresponding storage node. Comparing the second vector and the first vector in multidimensional space means comparing the feature of the received data and the feature of the data that has been stored in the storage node. Therefore, a storage node corresponding to a first vector closest to the feature of the received data may be obtained, and the storage node may be used as a similar storage node.

According to this embodiment of the present disclosure, a target storage node is determined in a manner of comparing a second vector of received data and first vectors that are corresponding to all storage nodes. A target storage node no longer needs to be determined in a manner of extracting some fingerprint values as samples from received data and sending the fingerprint values to all storage nodes in a data processing system for query, thereby avoiding multiple times of interaction between a client and the storage nodes, improving deduplication performance, and reducing a delay while reducing network bandwidth occupation.

In this embodiment of the present disclosure, the second vector corresponding to the received data is obtained, where the second vector represents the feature of the received data as a whole, and a corresponding first vector is preset for each storage node during initialization. After the duplicate data search, a non-duplicate data block that needs to be stored in the data processing system is obtained, and this embodiment of the present disclosure provides two manners of storing a non-duplicate data block. Referring to FIG. 2A, manner A includes the following.

A vector corresponding to a non-duplicate data block that needs to be stored is calculated, and the vector and a first vector corresponding to a storage node are compared to determine a second target storage node that stores the non-duplicate data block. Therefore, this embodiment of the present disclosure may further include the following.

Step 204A: Obtain a non-duplicate data block in the received data, and store the obtained non-duplicate data block and a third fingerprint value corresponding to the non-duplicate data block in a cache of the first client.

Step 205A: Obtain a third vector of the non-duplicate data block in the cache when the non-duplicate data block stored in the cache of the first client meets a preset storage condition, where the third vector represents a feature of all non-duplicate data blocks in the cache.

Step 206A: Compare the third vector and each first vector stored on the first client to determine a storage node that is used to store the non-duplicate data block in the cache and the third fingerprint value corresponding to the non-duplicate data block in the cache.

A method for determining the storage node that is used to store the non-duplicate data block in the cache and the third fingerprint value corresponding to the non-duplicate data block in the cache is the same as the method for determining the foregoing target storage node.

It should be noted that for the third vector of the non-duplicate data block in the cache, one or more third vectors may be obtained. However, when one third vector is obtained, all non-duplicate data blocks in the cache are corresponding to the one third vector. Alternatively, the non-duplicate data block in the cache may be divided into multiple parts, and a corresponding third vector is determined for each part. A corresponding storage node that is used to store the data block is determined for each part according to the method provided by this embodiment of the present disclosure.

The preset storage condition may be that data stored in the cache reaches a size of a preset storage strip in a hard disk, a size of a storage unit in a hard disk, or the like, where the preset storage condition is not limited in this embodiment of the present disclosure.

In this embodiment of the present disclosure, a corresponding first vector is allocated to each storage node during initialization. The first vector needs to reflect a feature of data stored in a corresponding storage node, and therefore, a third vector that reflects a feature of non-duplicate data is obtained, and the third vector and all the first vectors are compared to determine a storage node that is used to store the non-duplicate data.

Referring to FIG. 2B, manner B is that data received by a client at a time is generally continuous and has greater similarity. Therefore, non-duplicate data that is found in the data received at a time may be directly stored in a target storage node on which duplicate data is searched for, and this embodiment of the present disclosure may further include the following.

Step 204B: Obtain a non-duplicate data block in the received data, and store the non-duplicate data block in the target storage node.

In manner A and manner B, a non-duplicate fingerprint value that is found in the second fingerprint value and that is returned by the target storage node is received, a data block corresponding to the non-duplicate fingerprint value is regarded as a non-duplicate data block, and therefore, the non-duplicate data block in the received data is finally obtained.

Figure 3:
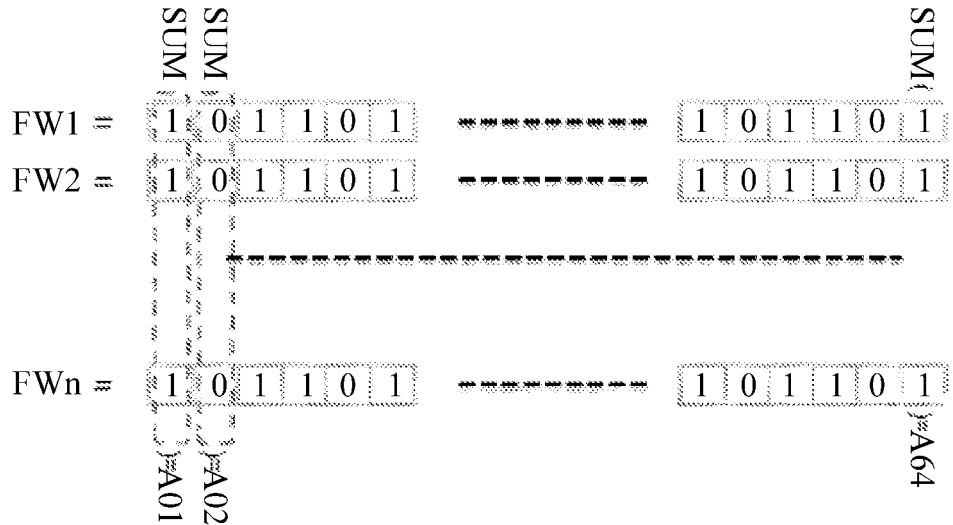
FIG. 3 is a schematic diagram of a second-vector calculation method according to an embodiment of the present disclosure.
Figure 4:
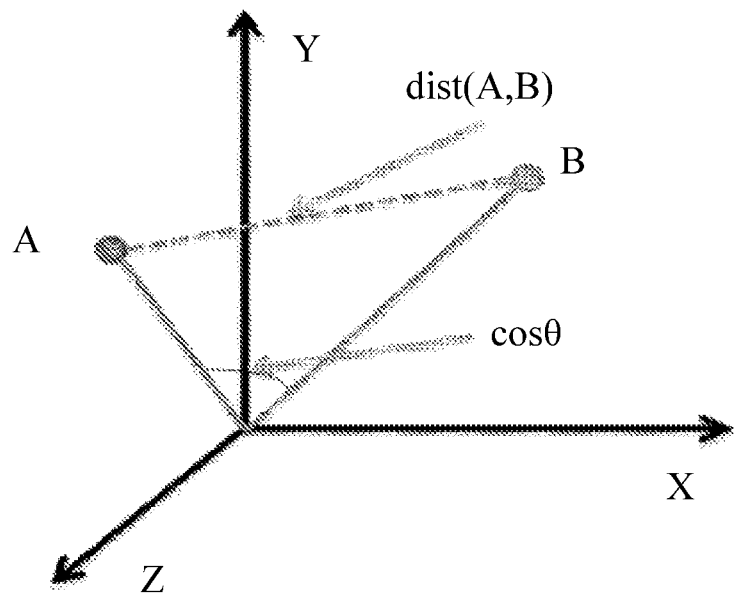
FIG. 4 is a schematic diagram of comparing a second vector and a first vector according to an embodiment of the present disclosure.

With reference to an example of a specific implementation manner, the following illustrates how to obtain a second vector and a target storage node in this embodiment. After received data is divided into blocks, 64 least significant bits are extracted from a second fingerprint value corresponding to each data block. Referring to FIG. 3, among the feature words extracted from each second fingerprint value, feature words that are at a same location in the second fingerprint values are added. A first-bit feature word in a fingerprint value FW1 and first-bit feature words in FW2 to FWn are added to obtain a numerical value A01, a second-bit feature word in the fingerprint value FW1 and second-bit feature words in FW2 to FWn are added to obtain a numerical value A02, and by calculation in sequence, 64 numerical values A03, A04 . . . , and A64 are obtained. The obtained 64 numerical values form a 64-dimensional array that is used as a second feature vector A corresponding to the received data. Referring to FIG. 4, in 64-dimensional space, a location of the second feature vector A is determined, and a distance between the second feature vector A and a first vector corresponding to a storage node is calculated, where a method for calculating a distance between two vectors in multidimensional space may be $$dist(X, Y) = \sqrt{\sum_{i=1}^{n}(x_i - y_i)^2},$$

where X and Y represent two vectors, i=1, 2, . . . , n; a first vector B closest to the second feature vector A or a first vector B that forms an included angle, with a smallest cosine value, with the second feature vector A is determined, where a storage node corresponding to the first vector B is determined as a target storage node.

According to the data processing method provided by this embodiment of the present disclosure, a target storage node is determined in a manner of comparing a second vector of received data and first vectors that are corresponding to all storage nodes and prestored on a client that receives the data. A target storage node no longer needs to be determined in a manner of extracting some fingerprint values as samples from received data and sending the fingerprint values to all storage nodes in a data processing system for query, and waiting for a feedback from the storage nodes, thereby avoiding multiple times of interaction between the client and the storage nodes, improving deduplication performance, and reducing a delay while reducing network bandwidth occupation.

Figure 5:
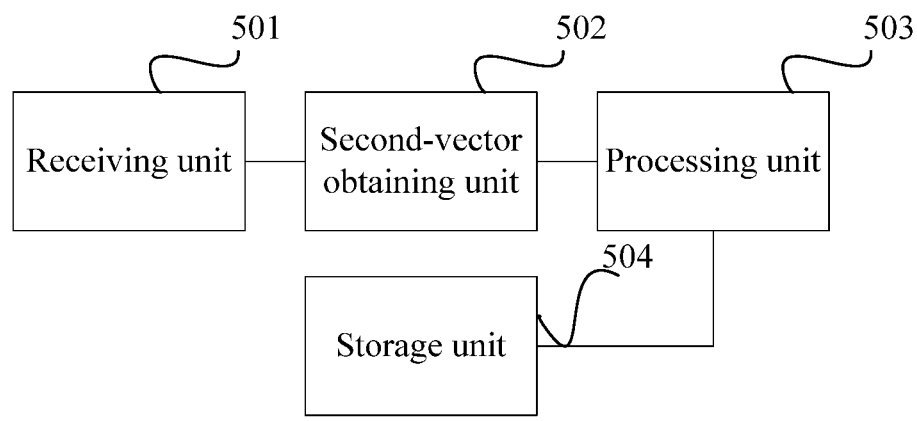
FIG. 5 is a schematic diagram of a structure of a client according to an embodiment of the present disclosure.

Referring to FIG. 5, an embodiment of the present disclosure provides a client that is used to execute the data processing method described in the foregoing embodiment. The client exists in a data processing system, and the data processing system includes at least one client and multiple storage nodes, where each storage node is corresponding to one first vector, the first vectors corresponding to all the storage nodes in the data processing system are stored on each client, a fingerprint value corresponding to data stored in the storage node is a first fingerprint value, and each client is connected to each storage node in the data processing system.

The client includes a receiving unit 501 configured to receive data, divide the data into multiple data blocks, and obtain a second fingerprint value of each data block, a second-vector obtaining unit 502 configured to obtain a second vector corresponding to the received data, where the second vector represents a feature of the received data, and a processing unit 503 configured to compare the second vector and each first vector stored on the client to determine a target storage node, and send the second fingerprint values corresponding to the multiple data blocks to the target storage node to search for duplicate data, or load, to the client, a first fingerprint value corresponding to a data block stored in the target storage node to search for duplicate data.

The client may further include a storage unit 504 configured to obtain a non-duplicate data block in the received data, and store the obtained non-duplicate data block and a third fingerprint value corresponding to the non-duplicate data block in a cache of the client; obtain a third vector of the non-duplicate data block in the cache when the non-duplicate data block stored in the cache of the client meets a preset storage condition, where the third vector represents a feature of all non-duplicate data blocks in the cache; and compare the third vector and each first vector stored on the client to determine a storage node that is used to store the non-duplicate data block in the cache and the third fingerprint value corresponding to the non-duplicate data block in the cache.

An embodiment of the present disclosure further provides another client whose structure is the same as that of the foregoing client except that a function of the storage unit 504 is different, where the storage unit 504 is configured to obtain a non-duplicate data block in the received data and store the non-duplicate data block in the target storage node.

The processing unit 503 is further configured to determine, in same multidimensional space, a location of the second vector and a location of the first vector, compare, in the multidimensional space, the second vector and the first vector to determine at least one first vector closest to the second vector or at least one first vector that forms an included angle, with a smallest cosine value, with the second vector, where a storage node corresponding to the at least one first vector is the target storage node.

A detailed working principle of the client provided by this embodiment of the present disclosure is the same as that in the foregoing method embodiment. Only the structure of the client is described herein, and for detailed descriptions, reference may be made to the descriptions in the foregoing method embodiment.

An embodiment of the present disclosure further provides a data processing system. Referring to FIG. 1A and FIG. 1B, the data processing system includes multiple storage nodes and the client in the foregoing embodiment, where each storage node is corresponding to one first vector, the first vectors corresponding to all the storage nodes in the data processing system are stored on each client, a fingerprint value corresponding to data stored in the storage node is a first fingerprint value, and each client is connected to each storage node in the data processing system.

Figure 6:
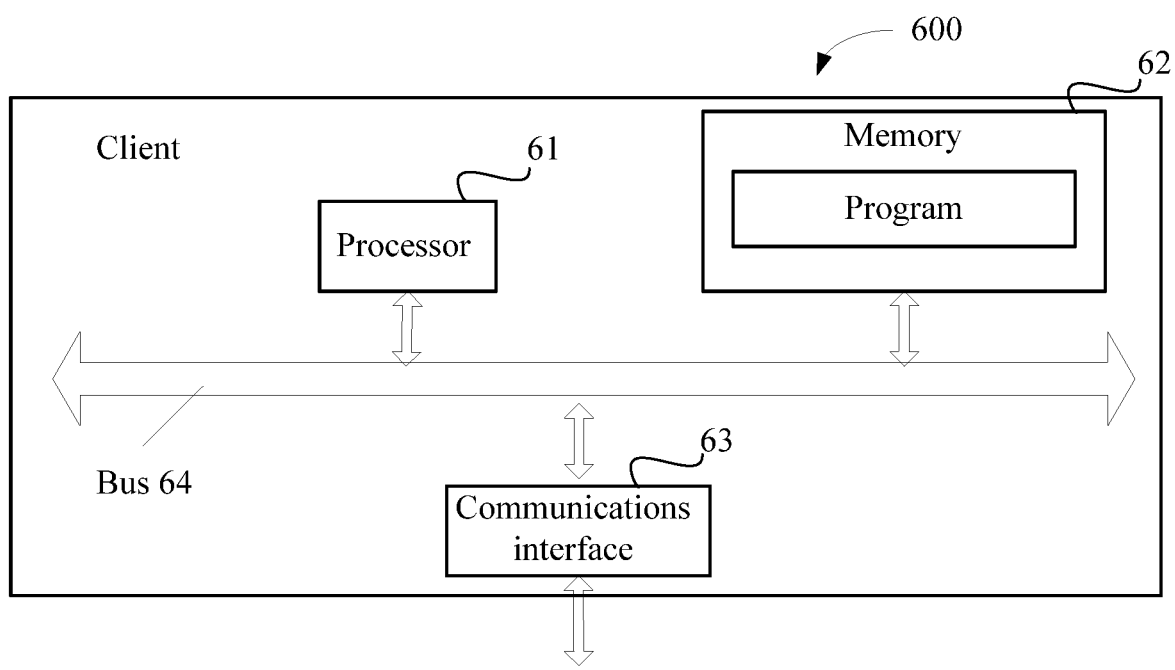
FIG. 6 is a schematic diagram of a structure of a client according to an embodiment of the present disclosure.

Referring to FIG. 6, an embodiment of the present disclosure further provides a client 600, including a processor 61, a memory 62, a communications interface 63, and a bus 64.

The processor 61, the communications interface 63, and the memory 62 communicate with each other using the bus 64, and the communications interface 63 is configured to receive and send data.

The memory 62 is configured to store a program, and the memory 62 may include a high speed random access memory (RAM), or may further include a non-volatile memory, such as at least one magnetic disk memory.

The processor 61 is configured to execute the program in the memory to execute the method provided in the foregoing method embodiment.

According to the client provided by this embodiment of the present disclosure, a target storage node is determined in a manner of comparing a second vector of received data and first vectors that are corresponding to all storage nodes and prestored on a client that receives the data. A target storage node no longer needs to be determined in a manner of extracting some fingerprint values as samples from received data and sending the fingerprint values to all storage nodes in a data processing system for query, and waiting for a feedback from the storage nodes, thereby avoiding multiple times of interaction between the client and the storage nodes, improving deduplication performance, and reducing a delay while reducing network bandwidth occupation.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some communications interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a computer software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a read-only memory (ROM), a magnetic disk, or an optical disc.

What is claimed is:

1. A data processing method in a data processing system comprising a client, the data processing method comprising:
   receiving, by the client, data;
   dividing, by the client, the data into multiple data blocks;
   extracting one or more bits from fingerprint values obtained for each of the multiple data blocks;
   converting a bit whose value is zero in the extracted bits into negative one to obtain a converted bit;
   obtaining a new vector by adding the converted bit that is at a same location in each of the fingerprint values of the multiple data blocks; and
   comparing, in a same multidimensional space, each location of a first vector, a second vector, and the new vector to determine a storage node as a first target storage node for deduplication;
   wherein the first vector represents a feature of data blocks stored in a first storage node;
   wherein the second vector represents a feature of data blocks stored in a second storage node; and
   wherein the first storage node corresponding to the first vector is the first target storage node responsive to a first included angle formed by the first vector and the new vector having a smaller cosine value than a second included angle formed by the second vector and the new vector.

2. The data processing method of claim 1, further comprising:
   determining, by the client, non-deduplicate data blocks from the multiple data blocks by comparing the fingerprint values of the multiple data blocks and fingerprint values of the data blocks stored in the first storage node; and
   storing, by the client, the non-deduplicate data blocks.

3. The data processing method of claim 1, further comprising comparing, in the same multidimensional space, each location of the new vector, the first vector, and the second vector to determine the first vector as a vector closest to the new vector.

4. The data processing method of claim 2, further comprising sending the fingerprint values of the multiple data blocks to the first storage node to search for duplicate data by comparing the fingerprint values of the multiple data blocks and the fingerprint values of the data blocks stored in the first storage node to determine non-deduplicate data blocks from the multiple data blocks.

5. The data processing method of claim 2, further comprising loading the fingerprint values of the data blocks stored in the first storage node to search for duplicate data by comparing the fingerprint values of the multiple data blocks and the fingerprint values of the data blocks stored in the first storage node to determine non-deduplicate data blocks from the multiple data blocks.

6. The data processing method of claim 1, wherein, for each fingerprint value, the extracted bits comprise a set of most-significant bits of the fingerprint value or a set of least-significant bits of the fingerprint value.

7. The data processing method of claim 1, further comprising receiving, by the client, an updated first vector for the first storage node based on data stored at the first storage node.

8. A client in a data processing system comprising:
   an interface; and
   one or more processors coupled to the interface and configured to:

receive data;

divide the data into multiple data blocks;

extract one or more bits from fingerprint values obtained for each of the multiple data blocks;

convert a bit whose value is zero in the extracted bits into negative one to obtain a converted bit;

obtain a new vector by adding the converted bit that is at a same location in each of the fingerprint values of the multiple data blocks; and compare, in a same multidimensional space, each location of a first vector, a second vector, and the new vector to determine a storage node as a first target storage node for deduplication;

wherein the first vector represents a feature of data blocks stored in a first storage node;

wherein the second vector represents a feature of data blocks stored in a second storage node; and wherein the first storage node corresponding to the first vector is the first target storage node responsive to a first included angle formed by the first vector and the new vector having a smaller cosine value than a second included angle formed by the second vector and the new vector.

9. The client of claim 8, wherein the one or more processors are further configured to:

determine non-deduplicate data blocks from the multiple data blocks by comparing the fingerprint values of the multiple data blocks and fingerprint values of the data blocks stored in the first storage node; and store the non-deduplicate data blocks.

10. The client of claim 8, wherein the one or more processors are further configured to compare, in the same multidimensional space, each location of the new vector, the first vector, and the second vector to determine the first vector as a vector closest to the new vector.

11. The client of claim 9, wherein the one or more processors are further configured to send the fingerprint values of the multiple data blocks to the first storage node to search for duplicate data by comparing the fingerprint values of the multiple data blocks and the fingerprint values of the data blocks stored in the first storage node to determine non-deduplicate data blocks from the multiple data blocks.

12. The client of claim 9, wherein the one or more processors are further configured to load the fingerprint values of the data blocks stored in the first storage node to search for duplicate data by comparing the fingerprint values of the multiple data blocks and the fingerprint values of the data blocks stored in the first storage node to determine non-deduplicate data blocks from the multiple data blocks.

13. The client of claim 8, wherein, for each fingerprint value, the extracted bits comprise a set of most-significant bits of the fingerprint value or a set of least-significant bits of the fingerprint value.

14. The client of claim 8, wherein the one or more processors are further configured to receive, from the first storage node, an updated first vector for the first storage node based on data stored at the first storage node.

15. A nonvolatile computer readable storage medium comprising instructions that when executed by one or more processors, cause the one or more processors to:

receive data;

divide the data into multiple data blocks;

extract one or more bits from fingerprint values obtained for each of the multiple data blocks;

convert a bit whose value is zero in the extracted bits into negative one to obtain a converted bit;

obtain a new vector by adding the converted bit that is at a same location in each of the fingerprint values of the multiple data blocks; and compare, in a same multidimensional space, each location of a first vector, a second vector, and the new vector to determine a storage node as a first target storage node for deduplication;

wherein the first vector represents a feature of data blocks stored in a first storage node;

wherein the second vector represents a feature of data blocks stored in a second storage node; and wherein the first storage node corresponding to the first vector is the first target storage node responsive to a first included angle formed by the first vector and the new vector having a smaller cosine value than a second included angle formed by the second vector and the new vector.

16. The nonvolatile computer readable storage medium of claim 15, wherein when executed by the one or more processors, the instructions further cause the one or more processors to:

determine non-deduplicate data blocks from the multiple data blocks by comparing the fingerprint values of the multiple data blocks and fingerprint values of the data blocks stored in the first storage node; and store the non-deduplicate data blocks.

17. The nonvolatile computer readable storage medium of claim 15, wherein when executed by the one or more processors, the instructions further cause the one or more processors to compare, in the same multidimensional space, each location of the new vector, the first vector, and the second vector to determine the first vector as a vector closest to the new vector.

18. The nonvolatile computer readable storage medium of claim 16, wherein when executed by the one or more processors, the instructions further cause the one or more processors to send the fingerprint values of the multiple data blocks to the first storage node to search for duplicate data by comparing the fingerprint values of the multiple data blocks and the fingerprint values of the data blocks stored in the first storage node to determine non-deduplicate data blocks from the multiple data blocks.

19. The nonvolatile computer readable storage medium of claim 16, wherein when executed by the one or more processors, the instructions further cause the one or more processors to load the fingerprint values of the data blocks stored in the first storage node to search for duplicate data by comparing the fingerprint values of the multiple data blocks and the fingerprint values of the data blocks stored in the first storage node to determine non-deduplicate data blocks from the multiple data blocks.

20. The nonvolatile computer readable storage medium of claim 15, wherein for each fingerprint value, the extracted bits comprise a set of most-significant bits of the fingerprint value or a set of least-significant bits of the fingerprint value.

* * * * *